(12) United States Patent
Kudo et al.

(10) Patent No.: US 8,414,136 B2
(45) Date of Patent: Apr. 9, 2013

(54) VEHICLE MIRROR APPARATUS (75) Inventors: Nobuhiro Kudo, Aichi-ken (JP); Isao Sumi, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 197 days.

(21) Appl. No.: 13/020,366

(22) Filed: Feb. 3, 2011

(65) Prior Publication Data

US 2011/0194202 A1 Aug. 11, 2011

(30) Foreign Application Priority Data

Feb. 8, 2010 (JP) ................................ 2010-025593

(51) Int. Cl.
*G02B 5/08* (2006.01)
*G02B 7/18* (2006.01)
*G02B 7/182* (2006.01)

(52) U.S. Cl.
USPC ............................ 359/841; 359/844; 359/877

(58) Field of Classification Search ................... 359/881, 359/841, 844, 877
See application file for complete search history.

(56) References Cited

U.S. PATENT DOCUMENTS

| 5,042,932 | A | | 8/1991 | Pent |
| 5,629,810 | A | * | 5/1997 | Perry et al. ..................... 359/872 |
| 7,690,800 | B2 | * | 4/2010 | Fukai et al. ................... 359/877 |

FOREIGN PATENT DOCUMENTS

| DE | 3914334 | 10/1990 |
| EP | 1382488 | 1/2004 |
| JP | 56-21101 | 2/1981 |
| JP | 63-44279 | 11/1988 |
| JP | 11255025 | 9/1999 |
| JP | 11255027 | 9/1999 |
| WO | 2006/040799 | 4/2006 |

* cited by examiner

*Primary Examiner* — Jade R Chwasz
(74) *Attorney, Agent, or Firm* — Roberts, Mlotkowski, Safran & Cole P.C.

(57) ABSTRACT

A vehicle mirror apparatus comprising a mirror provided at a vehicle; a pivoting member holding the mirror; a sliding part provided at the pivoting member; a holding member pivotably holding the pivoting member, whereby an angle of a mirror surface of the mirror is adjusted; and a pivoting surface provided at the holding member. The sliding part is made slidable on the pivoting surface while a gap is provided between an edge of the holding member at a side of the pivoting member and the pivoting member in a pivoting radial direction of the pivoting member.

7 Claims, 5 Drawing Sheets

VEHICLE MIRROR APPARATUS

CROSS-REFERENCE TO RELATED APPLICATION

This application claims priority under 35 USC 119 from Japanese Patent Application, No. 2010-025593 filed Feb. 8, 2010, the disclosure of which is incorporated by reference herein.

BACKGROUND OF THE INVENTION

1. Technical Field

The invention relates to a vehicle mirror apparatus in which a mirror surface angle is adjusted by pivot of a pivoting member by which the mirror is held.

2. Related Art

In a mirror surface angle adjusting apparatus described in WO 2006/040799, a mirror is mounted on a pivot plate and the pivot plate is held pivotably in a housing. The mirror surface angle of the mirror is adjusted by the pivot plate being driven and pivoted.

Further, a sliding part is provided in the pivot plate and a receiving portion is formed in the housing so that the sliding part is slid on the receiving portion when the pivot plate is pivoted.

In the mirror surface angle adjusting apparatus, the sliding part is curved around a pivot center of the pivot plate and when the pivot plate is pivoted, the sliding part is slid at an edge of the receiving portion on the side of the pivot plate.

Thus, dust or the like from an external environment is likely to get in a sliding area between the sliding part and the receiving portion, making the vehicle mirror apparatus less resistant to the external environment.

SUMMARY

The present invention takes the above fact into consideration and obtains a vehicle mirror apparatus which is less susceptible to an external environment.

A vehicle mirror apparatus according to a first aspect of the invention includes a mirror provided at a vehicle; a pivoting member holding the mirror; a sliding part provided at the pivoting member; a holding member by which the pivoting member is pivotably held, whereby an angle of a mirror surface of the mirror is adjusted; and a pivoting surface provided at the holding member. When the pivoting member is pivoted, the sliding part is made slidable on the pivoting surface while a gap is formed between an edge of the holding member at a side of the pivoting member and the pivoting member in a pivoting radial direction of the pivoting member.

A vehicle mirror apparatus according to a second aspect of the invention includes a mirror provided at a vehicle; a pivoting member holding the mirror; a sliding part provided at the pivoting member; a holding member pivotably holding the pivoting member, whereby an angle of a mirror surface of the mirror is adjusted; and a pivoting surface provided at the holding member. When the pivoting member is pivoted, the sliding part is made slidable on the pivoting surface and an area in which the sliding part is slid is made larger than an area of a sliding site of the sliding part.

A vehicle mirror apparatus according to a third aspect of the invention includes a mirror provided at a vehicle; a pivoting member holding the mirror; a sliding part provided at the pivoting member; a holding member pivotably holding the pivoting member, whereby an angle of a mirror surface of the mirror is adjusted; and a pivoting surface provided at the holding member. When the pivoting member is pivoted, the sliding part is made slidable on the pivoting surface and a curvature of the pivoting surface is made smaller than a curvature of the sliding part.

A vehicle mirror apparatus according to a fourth aspect of the invention, in the vehicle mirror apparatus of any one of the first to the third aspects, wherein the pivoting surface is curved around a pivot center of the pivoting member.

A vehicle mirror apparatus according to a fifth aspect of the invention, in the vehicle mirror apparatus of any one of the first to fourth aspects, further includes a driving member which is connected to the pivoting member, provided in an inner circumferential side of the pivoting surface, and drives the pivoting member to pivot.

In the vehicle mirror apparatus according to the first aspect, a mirror provided at a vehicle is held by a pivoting member and the pivoting member is pivotably held by a holding member. An angle of a mirror surface of the mirror is adjusted when the pivoting member is pivoted.

Further, a sliding part is provided at the pivoting member and a pivoting surface is provided on the holding member.

When the pivoting member is pivoted, the sliding part is made slidable on the pivoting surface while a gap is provided between an edge of the holding member and the pivoting member in a pivoting radial direction of the pivoting member. The sliding part is made slidable at a portion from the edge toward an opposite side of the pivoting member on the pivoting surface. Accordingly, dust or the like from an external environment may be prevented from getting into a sliding area between the sliding part and the pivoting surface, making the vehicle mirror apparatus more resistant to the external environment.

In the vehicle mirror apparatus according to the second aspect, a mirror provided at a vehicle is held by a pivoting member and the pivoting member is pivotably held by a holding member and an angle of a mirror surface of the mirror is adjusted when the pivoting member is pivoted.

Further, a sliding part is provided at the pivoting member and a pivoting surface is provided on the holding member so that the sliding part is slid on the pivoting surface when the pivoting member is pivoted.

An area of the pivoting surface where the sliding part slides is made larger than an area of a sliding site of the sliding part. The sliding part is made slidable at an area from the edge toward an opposite side of the pivoting member on the pivoting surface. Accordingly, dust or the like from an external environment may be prevented from getting into a sliding area between the sliding part and the pivoting surface, making the vehicle mirror apparatus more resistant to the external environment.

In the vehicle mirror apparatus according to the third aspect, a mirror provided at a vehicle is held by a pivoting member and the pivoting member is pivotably held by a holding member and an angle of a mirror surface of the mirror is adjusted when the pivoting member is pivoted.

Further, a sliding part is provided at the pivoting member and a pivoting surface is provided on the holding member so that the sliding part is slid on the pivoting surface when the pivoting member is pivoted.

A curvature of the pivoting surface is made smaller that a curvature of the sliding part. The sliding part is made slidable at an area from the edge toward an opposite side of the pivoting member on the pivoting surface. Accordingly, dust or the like from an external environment may be prevented from getting into a sliding area between the sliding part and the pivoting surface, making the vehicle mirror apparatus more resistant to the external environment.

In the vehicle mirror apparatus according to the fourth aspect, a pivoting surface is curved around a pivot center of a pivoting member.

Thus, even if dimensional variations between the sliding part and the pivoting surface should arise in a pivoting radial direction of the pivoting member, a displacement length in a pivot center axis direction of the pivoting member may be made smaller when the pivoting member is pivoted and the sliding part is slid on the pivoting surface. Accordingly, pivot of the pivoting member may be stabilized.

In the vehicle mirror apparatus according to the fifth aspect, a driving member is connected to a pivoting member and the driving member drives the pivoting member to pivot.

Since the driving member is arranged on an inner circumferential side of a pivoting surface, the pivoting surface may be made larger so that pivot of the pivoting member may be stabilized.

BRIEF DESCRIPTION OF THE DRAWINGS

Exemplary embodiments of the invention will be described in detail based on the following figures, wherein.

DETAILED DESCRIPTION OF THE INVENTION

Figure 1:
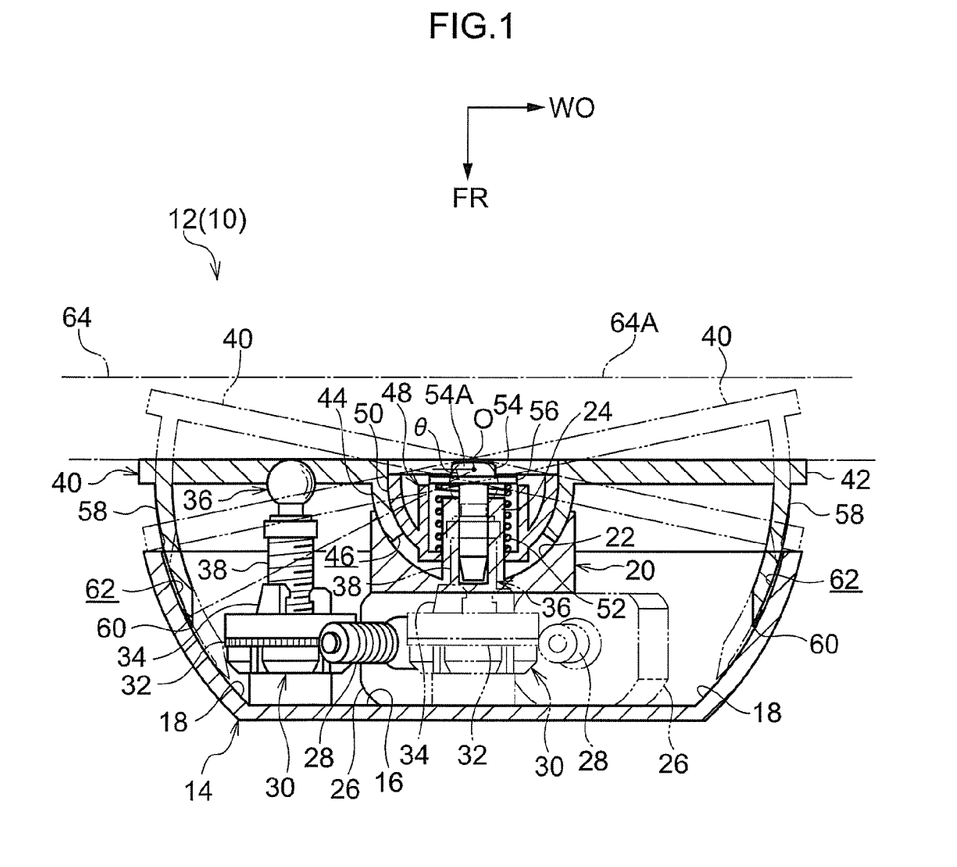
FIG. 1 is a sectional view showing a mirror surface adjusting apparatus of a vehicle door mirror apparatus according to an exemplary embodiment of the invention when viewed from below.
Figure 2:
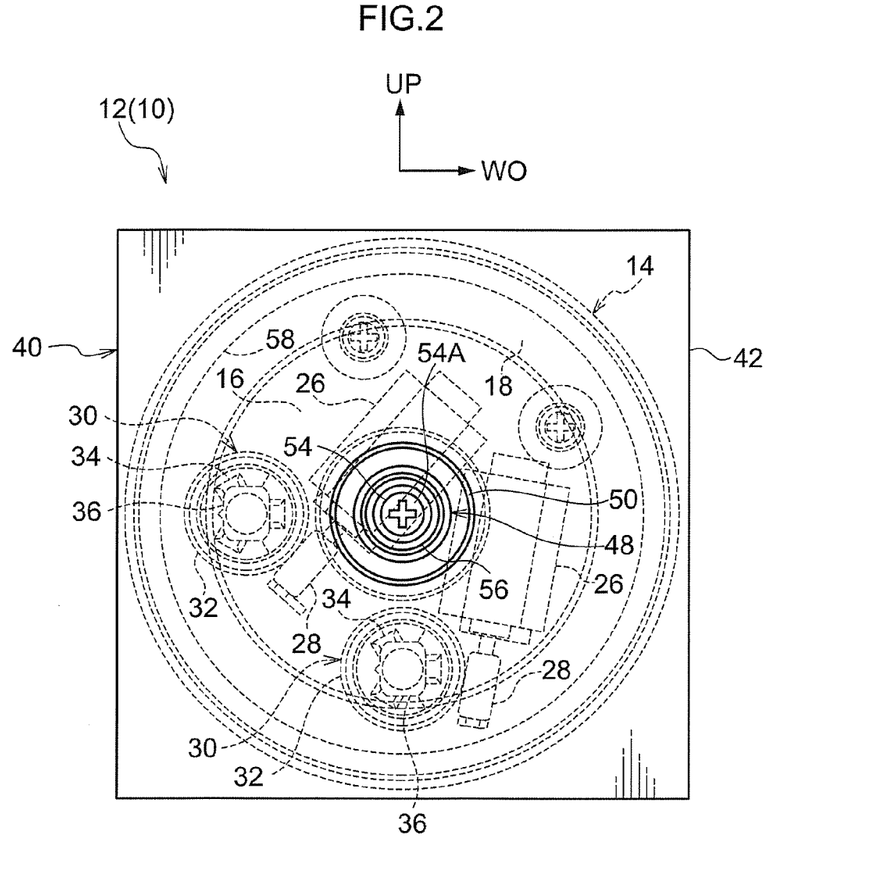
FIG. 2 is a front view showing the mirror surface adjusting apparatus of the vehicle door mirror apparatus according to the exemplary embodiment of the invention when viewed from a rear position of the vehicle.
Figure 3:
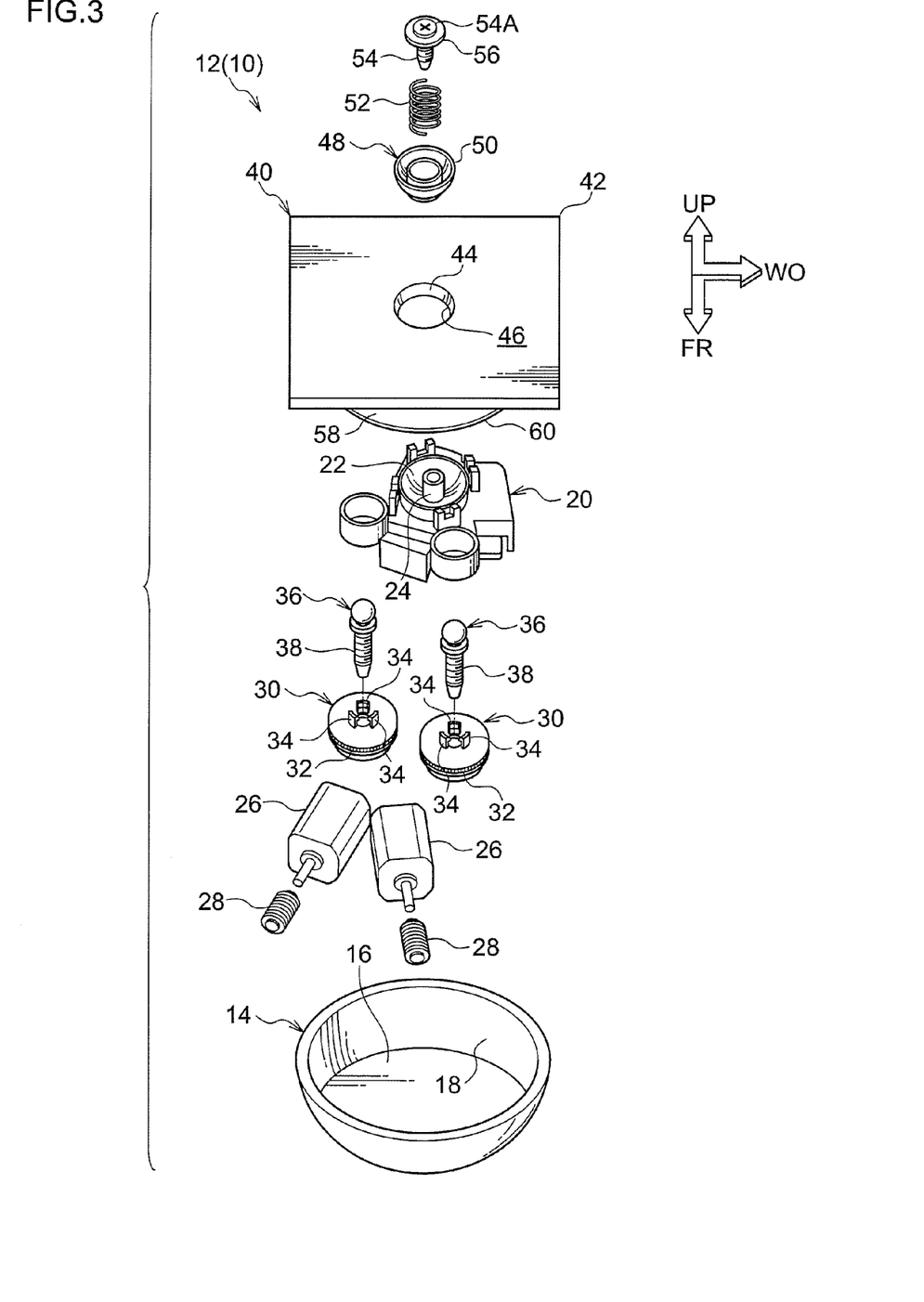
FIG. 3 is an exploded perspective view showing the mirror surface adjusting apparatus of the vehicle door mirror apparatus according to the exemplary embodiment of the invention when viewed from a diagonally rear position of the vehicle.

FIG. 1 shows main components of a vehicle door mirror apparatus 10 according to an exemplary embodiment of a vehicle mirror apparatus of the invention as a sectional view when viewed from below. FIG. 2 shows main components of the vehicle door mirror apparatus 10 as a front view when viewed from a rear position of the vehicle. FIG. 3 shows main components of the vehicle door mirror apparatus 10 as an exploded perspective view when viewed in a diagonal direction from lower side of the rear position of the vehicle. In the drawings, the front direction of the vehicle is indicated by an arrow FR, a width direction by an arrow WO, and the upward direction by an arrow UP.

The vehicle door mirror apparatus 10 is installed at a door of the vehicle and a mirror surface angle adjusting apparatus 12 is provided inside the vehicle door mirror apparatus 10.

As shown in FIGS. 1 to 3, the mirror surface angle adjusting apparatus 12 includes a case 14 in a substantially semispherical container shape as a body unit constituting a holding member. The case 14 is fixed to the inside of the vehicle door mirror apparatus 10. An end of the case 14 in a rear direction of the vehicle is open and an end of an inner circumference of the case 14 in a front direction of the vehicle is made a bottom 16 in a circular shape. Both side faces of the inner circumference of the case 14 are made pivoting surfaces 18 in a bowl shape and the pivoting surfaces 18 are curved in a spherical shape around a pivot center O of a mirror holder 40 described below.

A case inner 20 in a container shape is fixed to the bottom 16 of the case 14 as a fixing portion constituting a holding member and an end of the case inner 20 in the front direction of the vehicle is open. A holding surface 22 in a substantially semispherical shape is formed as a holding portion on a side face of the case inner 20 in the rear direction of the vehicle. The holding surface 22 has an end open in the rear direction of the vehicle and is curved in a spherical shape around the pivot center 0 of the mirror holder 40 described below. A fixing cylinder 24 in a cylindrical shape is integrally formed at the bottom (edge on the front side of the vehicle) of the holding surface 22 as an engaging portion and a central axis of the fixing cylinder 24 coincides with central axes of the pivoting surfaces 18 and the holding surface 22.

A pair of motors 26 as a driving unit is provided at the bottom 16 of the case 14 and the pair of motors 26 is fixed to the case inner 20. An output axis of the motor 26 is projected out of the case inner 20 and a worm 28 is fixed to the output axis of the motor 26.

A pair of wheel drives 30 in a substantially cylindrical shape as a connecting member is freely rotatably supported on the bottom 16 of the case 14. The wheel drive 30 has a worm wheel 32 formed therein and the worm wheel 32 is engaged with the worm 28. Thus, if the motor 26 is driven and the worm 28 is rotated, the worm wheel 32 is rotated and thus, the wheel drive 30 is rotated.

The wheel drive 30 has a predetermined number (three in the present exemplary embodiment) of engaging claws 34 as engaging portions formed integrally and the engaging claws 34 are arranged at equal intervals in a circumferential direction of the wheel drive 30. The engaging claw 34 is elastic and is projected to the rear side of the vehicle from the wheel drive 30, and the tip (edge in the rear direction of the vehicle) of the engaging claw 34 is protruded to the inner side in a radial direction of the wheel drive 30.

A rod drive 36 in a substantially circular axis shape as a driving member is inserted into the wheel drive 30. Rotation around the central axis of the rod drive 36 is restricted. A pair of rod drives 36 is arranged at an inner side of the pivoting surface 18 of the case 14. One wheel drive 30 is provided at below or above in the vehicle up and down direction of the central axis of the pivoting surface 18 and the other wheel drive 30 is provided at an either one side in the vehicle width direction of the central axis of the pivoting surface 18.

Other portion than an end portion in the vehicle rear direction of the rod drive 36 is formed as a screw 38 and the tip of the engaging claw 34 of the wheel drive 30 is engaged with the screw 38. Thus, as described above, with the motor 26 being driven and the wheel drive 30 (including the engaging claw 34) being rotated, the engaging position of the tip of the engaging claw 34 with the screw 38 is displaced and the rod drive 36 is moved in a front/rear direction of the vehicle.

The mirror holder 40 as a pivoting member is provided at the vehicle rear side of the case 14 and has a holder portion 42 in a plate shape formed therein.

Figure 5:
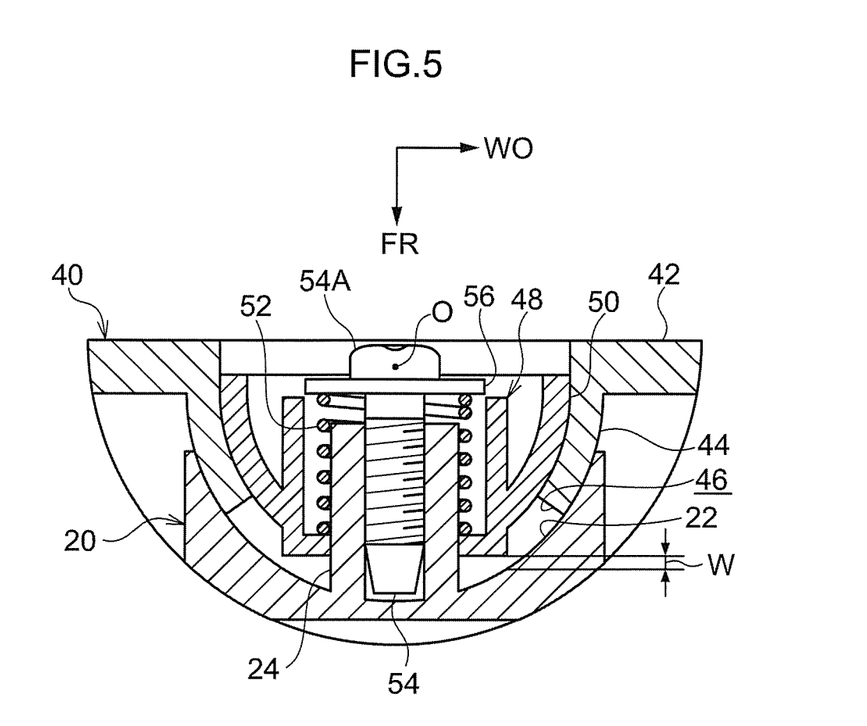
FIG. 5 is a sectional view showing a pivot center portion of a mirror holder of the mirror surface adjusting apparatus of the vehicle door mirror apparatus according to the exemplary embodiment of the invention when viewed from below.

As shown in FIG. 5 in detail, a holding wall 44 in a substantially semispherical wall shape is integrally formed at the center of the holder portion 42. The holding wall 44 has an end open in the rear direction of the vehicle and is curved in a spherical shape around a pivot center O of the mirror holder 40 described below. A through-hole 46 in a circular shape is formed at the bottom (in the front direction of the vehicle) of the holding wall 44 and the fixing cylinder 24 of the case inner 20 is inserted through the through-hole 46. Accordingly, the holding wall 44 is fitted to the holding surface 22 of the case inner 20.

A support pivot 48 in a substantially cylindrical shape as an urging member is provided inside the holding wall 44 and the fixing cylinder 24 of the case inner 20 is inserted into the support pivot 48. The inner diameter at an end of the support pivot 48 in the front direction of the vehicle is smaller than that of other portions and the fixing cylinder 24 is fitted into the end of the support pivot 48 in the front direction of the vehicle.

An urging wall 50 in a substantially semispherical wall shape is integrally formed at the outer circumference of the support pivot 48 and the urging wall 50 has an end open in the rear direction of the vehicle and is curved in a spherical shape around the pivot center O of the mirror holder 40 described below. The urging wall 50 is fitted onto the holding wall 44 of the mirror holder 40 and a gap of a minimum width W is formed in a front/rear direction of the vehicle between an end of the support pivot 48 in the vehicle front direction and the holding surface 22 of the case inner 20.

Inside the support pivot 48, coil spring 52 configuring the urging member is provided on the outer circumferential side of the fixing cylinder 24 of the case inner 20 and the end of the coil spring 52 in the vehicle front direction is engaged with the end of the support pivot 48 in the vehicle front direction.

A screw 54 constituting a fixing member is screwed into the fixing cylinder 24 of the case inner 20 and the screw 54 is passed through a washer 56 in a toric plate shape constituting a fixing member. With the end of the coil spring 52 in the front direction of the vehicle engaged, the washer 56 is engaged with a head 54A of the screw 54 and the coil spring 52 is compressed to urge the end of the support pivot 48 toward the front side of the vehicle.

With an urging force of the coil spring 52, the holding wall 44 of the mirror holder 40 is sandwiched between the urging wall 50 of the support pivot 48 and the holding surface 22 of the case inner 20, and the mirror holder 40 is pivotably held around the pivot center O of the case inner 20.

As shown in FIGS. 1 to 3, the end portion in the rear direction of the vehicle of the rod drive 36 pivotably holds the holder portion 42 of the mirror holder 40 and, as described above, with the motor 26 being driven and the rod drive 36 being moved in the front/rear direction of the vehicle, the mirror holder 40 is driven and pivoted.

A pivoting wall 58 in a substantially semispherical wall shape is integrally formed on the face of the holder portion 42 in the vehicle front direction and an end of the pivoting wall 58 in the front direction of the vehicle is open. The pivoting wall 58 is arranged on the inner circumferential side of the pivoting surface 18 of the case 14 and the outer circumferential surface and inner circumferential surface of the pivoting wall 58 are curved in a spherical shape around the pivot center O of the mirror holder 40.

Figure 4:
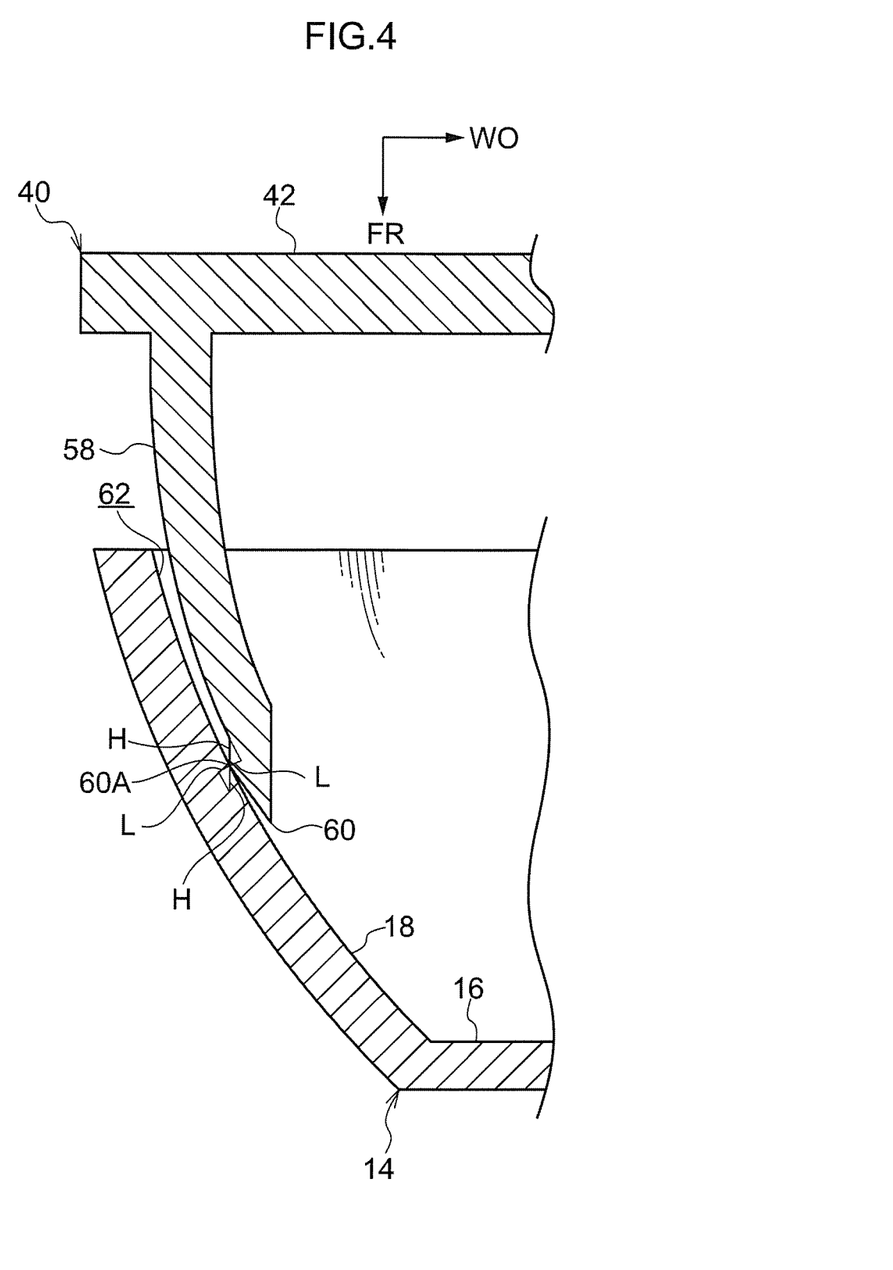
FIG. 4 is a sectional view showing main components of the mirror surface adjusting apparatus of the vehicle door mirror apparatus according to the exemplary embodiment of the invention when viewed from below.

As shown in FIG. 4 in detail, a sliding part 60 having a rectangular sectional shape is integrally formed at the end of the pivoting wall 58 in the front direction of the vehicle. The sliding part 60 protrudes from the pivoting wall 58 in the front direction as well as a lateral direction of the vehicle. The outer surface (curved surface in the front direction of the vehicle) of the sliding part 60 is made a circumferential surface around the central axis of the pivoting wall 58. The circumferential surface of the sliding part 60 has a shape being inclined to inward in a radial direction of the sliding part 60 while extending toward the vehicle front direction.

An angular portion in the vehicle rear direction of the outer circumferential surface of the sliding part 60 is made as a sliding site 60A. A curvature of the sliding part 60 is made larger than that of the pivoting surface 18, whereby the sliding site 60A contacts (line contact, pressure contact) with the pivoting surface 18. Thus, the sliding site 60A slides on the pivoting surface 18 by the mirror holder 40 being pivoted. Note that the sliding site 60A may be formed at an angular portion in the vehicle front direction of the outer circumferential surface of the sliding part 60 or at an intermediate portion of the outer circumferential surface of the sliding part 60. The entire outer circumferential surface of the sliding part 60 may be formed as the sliding site 60A.

A gap 62 is formed between the pivoting wall 58 and the pivoting surface 18 in the rear direction of the vehicle from the sliding site 60A throughout the end of the pivoting surface 18. The width of the gap 62 in a radial direction of the sliding surface 18 is constant excluding between the outer circumferential surface of the sliding part 60 and the pivoting surface 18. An area of the pivoting surface 18 on which the sliding site 60A slides is larger than an area of the sliding site 60A.

As shown in FIG. 1, a mirror 64 is held by the holder portion 42 at the vehicle rear side of the mirror holder 40 and the mirror 64 is made pivotable integrally with the mirror holder 40. The face of the mirror 64 on the vehicle rear side is made a mirror surface 64A so that a passenger of the vehicle may visually recognize in the rear direction of the vehicle through the mirror 64.

Next, operations of the present exemplary embodiment are described.

In the vehicle door mirror apparatus 10 configured as described above, with the motor 26 being driven and the worm 28 being rotated within the mirror surface angle adjusting apparatus 12, the wheel drive 30 (including the worm wheel 32 and a predetermined number of the engaging claws 34) is rotated and the rod drive 36 is moved in the front/rear direction of the vehicle. Thus, the mirror holder 40 and the mirror 64 are driven by the rod drive 36 so that the mirror holder 40 and the mirror 64 are pivoted in at least either one of the vertical direction or the horizontal direction of the vehicle, whereby an angle of the mirror surface 64A is adjusted in the vertical direction or the horizontal direction of the vehicle.

When the mirror holder 40 is manually pivoted through the mirror 64 and the engaging claw 34 of the wheel drive 30 is temporarily deformed elastically, a thread top of the screw 38 of the rod drive 36 climbs over the tip of the engaging claw 34 so that the engaging position of the tip of the engaging claw 34 with the screw 38 is displaced toward an axial direction of the screw 38 (front/rear direction of the vehicle). Thus, the rod drive 36 is manually moved in the front/rear direction of the vehicle and the mirror holder 40 and the mirror 64 are pivoted around the pivot center O in at least either one of the vertical direction or the horizontal direction of the vehicle whereby the angle of the mirror surface 64A is adjusted in the vertical direction or the horizontal direction.

When the mirror holder 40 is pivoted, the holding wall 44 of the mirror holder 40 is slid on the holding surface 22 of the case inner 20 and the urging wall 50 of the support pivot 48, and the sliding part 60 (the sliding site 60A) of the mirror holder 40 is also slid on the pivoting surface 18 of the case 14.

Even if there are dimensional variations of at least one of the pivoting surface 18 of the case 14 and the sliding part 60 (the sliding site 60A) of the mirror holder 40, when the mirror holder 40 is driven and pivoted, the support pivot 48 is moved in the front direction of the vehicle against an urging force of the coil spring 52 or the support pivot 48 is moved in the rear direction of the vehicle because of elastic deformation of the urging wall 50 such that the pivot center O of the mirror holder 40 is displaced in the front/rear direction of the vehicle thereby offsetting the dimensional variations.

The gap of the minimum width W is formed between the end of the support pivot 48 and the holding surface 22 of the case inner 20 in the front/rear direction of the vehicle so that when, as described above, the mirror holder 40 is driven and pivoted, the support pivot 48 may be moved in the front direction of the vehicle while elastically deforming the urging wall 50.

Further, when the angle of the mirror surface 64A is manually adjusted, the support pivot 48 (particularly the urging wall 50) is elastically deformed by a given force to create a state in which the mirror 64 and the mirror holder 40 are moved toward the front side of the vehicle by the minimum width W between the support pivot 48 and the holding surface 22 (state in which the end of the support pivot 48 on the front side of the vehicle is in contact with the holding surface 22). In this state, the engaging position of the tip of the engaging claw 34 of the wheel drive 30 with the rod drive 36 (the screw 38) is displaced toward the axial direction of the screw 38 so that the pivoting angle of the mirror 64 and the mirror holder 40 is adjusted. Then, the mirror 64 and the mirror holder 40 are moved toward the rear side of the vehicle due to restoration of elasticity of the support pivot 48 (particularly the urging wall 50).

Note that the sliding part 60 of the mirror holder 40 has the larger curvature than the pivoting surface 18 of the case 14 and the area of the pivoting surface 18 on which the sliding site 60A slides is made larger than the area of the sliding site 60A. Further, the gap 62 is formed between the pivoting wall 58 of the mirror holder 40 and the pivoting surface 18 at the throughout area from the sliding site 60A to the end of the pivoting surface 18 in the vehicle rear direction.

Thus, when the mirror holder 40 is pivoted, the sliding site 60A is made slidable on the pivoting surface 18 from the end thereof in the vehicle rear direction toward the vehicle front direction. Accordingly, dust or the like from an external environment may be prevented from getting into a sliding portion between the sliding site 60A and the pivoting surface 18, enabling the vehicle mirror apparatus more resistible to the external environment.

If, as shown in FIGS. 1 to 4, dimensional variations L between the sliding site 60A and the pivoting surface 18 should arise in the pivoting radial direction of the mirror holder 40, a displacement length H by which the sliding site 60A is displaced in the front/rear direction of the vehicle (equal to the displacement length H of the pivot center O of the mirror holder 40 in the front/rear direction of the vehicle) due to the dimensional variations is given by $$H = L/\sin\theta$$

where the angle between the open face in the rear direction of the vehicle of the pivoting surface 18 (surface perpendicular to the front/rear direction of the vehicle) and a straight line connecting the pivot center O of the mirror holder 40 and the sliding site 60A is set to $\theta$.

Even if there are the dimensional variations L between the sliding site 60A and the pivoting surface 18, the displacement length H of the pivot center O of the mirror holder 40 in the vehicle front/rear direction (center axis direction of the pivoting surface 18) may be made smaller because the angle $\theta$ is large.

Accordingly, when the mirror holder 40 is driven and pivoted, it is necessary to permit a displacement of the pivot center O of the mirror holder 40 in the front/rear direction of the vehicle corresponding to the displacement length H of the sliding site 60A in the front/rear direction of the vehicle described above and therefore, the support pivot 48 is moved in the front/rear direction of the vehicle. In this case, the displacement length H is small and thus, fluctuations in urging force of the coil spring 52 and fluctuations in pressure contact force of the sliding site 60A to the pivoting surface 18 may be made smaller. Therefore, fluctuations in sliding resistance of the holding wall 44 against the holding surface 22 and the urging wall 50 and fluctuations in sliding resistance of the sliding site 60A against the pivoting surface 18 may be made smaller so that pivot of the mirror holder 40 and the mirror 64 may be stabilized.

Further, the displacement length H of the pivot center O in the front direction of the vehicle may be made smaller and thus, the minimum width W of the gap between the end of the support pivot 48 in the front direction of the vehicle and the holding surface 22 may also be made smaller.

Therefore, in a case that the support pivot 48 has been moved in the vehicle rear direction so as to offset the dimensional variation, when the angle of the mirror surface 64A is manually adjusted, the pivoting angle of the mirror 64 and the mirror holder 40 (engaging position of the tip of the engaging claw 34 of the wheel drive 30 with the rod drive 36) may be adjusted while movement of the mirror 64 and the mirror holder 40 in the front direction of the vehicle due to elastic deformation of the support pivot 48 and the urging wall 50 is small. Accordingly, even if the mirror 64 and the mirror holder 40 are moved in the vehicle rear direction thereafter due to restoration of elasticity of the support pivot 48 (particularly the urging wall 50), the adjusted pivoting angle of the mirror 64 and the mirror holder 40 as described above may be prevented from fluctuating because the movement of the mirror 64 and the mirror holder 40 in the vehicle rear direction is small. Therefore, the angle of the mirror surface 64A of the mirror 64 is adjusted more accurately.

A pair of rod drives 36 is arranged on the inner circumferential side of the pivoting surface 18 of the case 14 and the sliding part 60 of the mirror holder 40. Thus, the pivoting surface 18 and the sliding part 60 may be made larger so that pivot of the mirror holder 40 by driving may further be stabilized.

In the present exemplary embodiment, when the mirror holder 40 is pivoted, the sliding site 60A of the mirror holder 40 is configured to slide from the contact portion with the pivoting surface 18 not only toward the front direction of the vehicle but also toward the edge of the vehicle rear direction of the pivoting surface 18. However, when the mirror holder 40 is pivoted, the sliding site 60A of the mirror holder 40 may be configured to slide only in the front direction of the vehicle from the contact portion with the pivoting surface 18 of the case 14, but not in the rear direction of the vehicle of the pivoting surface 18.

Further in the present exemplary embodiment, at least one of the pivoting surface 18 of the case 14 and the sliding part 60 of the mirror holder 40 may be configured to have at least one of a slit, hole, and recess formed therein or to be divided into plural portions, for example, around the center axis.

In the present exemplary embodiment, the pivoting surface between the mirror holder 40 and the case 14 is configured to be provided on the case 14, but the pivoting surface may be configured to be set to the case inner 20.

Further in the present exemplary embodiment, the pivoting wall 58 of the mirror holder 40 is configured to be in a substantially semispherical wall shape and to make the outer circumferential surface and inner circumferential surface of the pivoting wall 58 spherical, but the pivoting wall 58 only needs to have a shape capable of providing the sliding part 60 and, for example, the pivoting wall 58 may be configured to have a cylindrical shape so that at least one of the outer circumferential surface and inner circumferential surface of the pivoting wall 58 has a circular shape.

In the present exemplary embodiment, the invention is applied to the vehicle door mirror apparatus 10, but the invention may be applied to other mirror apparatuses outside the vehicle or mirror apparatuses inside the vehicle.

What is claimed is:

1. A vehicle mirror apparatus comprising:
   a mirror provided at a vehicle;
   a pivoting member holding the mirror;
   a sliding part provided at the pivoting member;
   a holding member pivotably holding the pivoting member, whereby an angle of a mirror surface of the mirror is adjusted; and
   a pivoting surface provided at the holding member,
   wherein the sliding part is made slidable on the pivoting surface while a gap is maintained between an entire circumference of an edge which is closest to a vehicular rear side of the holding member at a side of the pivoting member and the pivoting member in a pivoting radial direction of the pivoting member.

2. The vehicle mirror apparatus of claim 1, wherein the pivoting surface is curved around a pivot center of the pivoting member.

3. The vehicle mirror apparatus of claim 1, further comprising a driving member connected to the pivoting member, provided at an inner circumferential side of the pivoting surface, and driving the pivoting member to pivot.

4. A vehicle mirror apparatus comprising:
   a mirror provided at a vehicle;
   a pivoting member holding the mirror;
   a sliding part provided at the pivoting member;
   a holding member pivotably holding the pivoting member whereby an angle of a mirror surface of the mirror is adjusted; and
   a pivoting surface provided at the holding member;
   wherein the sliding part is made slidable on the pivoting surface, and an area of the pivoting surface on which the sliding part is slid is made larger than an area of a sliding site provided at the sliding part.

5. The vehicle mirror apparatus of claim 4, wherein the pivoting surface is curved around a pivot center of the pivoting member.

6. The vehicle mirror apparatus of claim 4, further comprising a driving member connected to the pivoting member, provided at an inner circumferential side of the pivoting surface, and driving the pivoting member to pivot.

7. A vehicle mirror apparatus comprising:
   a mirror provided at a vehicle;
   a pivoting member holding the mirror;
   a sliding part provided at the pivoting member;
   a holding member pivotably holding the pivoting member, whereby an angle of a mirror surface of the mirror is adjusted; and
   a pivoting surface provided at the holding member,
   wherein the sliding part is made slidable on the pivoting surface while a gap is maintained between an entire circumference of an edge which is closest to a vehicular rear side of the holding member at a side of the pivoting member and the pivoting member in a pivoting radial direction of the pivoting member, and
   wherein an area of the pivoting surface on which the sliding part is slid is made larger than an area of a sliding site provided at the sliding part.

* * * * *